Fig.-12b 3,224,265
METHOD FOR DETERMINING AERODYNAMIC INFLUENCE COEFFICIENTS OF A WING
Bernard Mazelsky, West Covina, and Harry B. Amey, Jr., Whittier, Calif., assignors to Aerojet-General Corporation, Azusa, Calif., a corporation of Ohio
Filed May 7, 1962, Ser. No. 192,863
9 Claims. (Cl. 73—147)

This invention relates to a method for determining the aerodynamic influence coefficients of a wing.

The importance of the aerodynamic influence coefficients is apparent from a consideration of the following matrix equation:

$$\{l\} = [Q]\{\alpha\}$$

where $l$ is the lift at various portions of the wing,
$\alpha$ is the angle of attack distribution, and
$Q$ is the aerodynamic influence coefficients which depend to some extent on the Mach number.

It is clear that once the aerodynamic influence coefficients are determined for a given speed range, the lift or loading on various portions of the wing depend only on the angle of attack. This information is highly important for predicting flutter and in studies of drag and stability.

Heretofore the calculation of a matrix of aerodynamic influence coefficient has been attempted analytically: of these the best known are the NASA Subsonic and Supersonic Kernel Function Procedures, and the Supersonic Box Method. However, despite their usefulness, the theoretical or analytical methods cannot account for non-linear effects, nor the effects due to leading edge bluntness. The defects of the prior analytical solutions were extremely important because flutter speed of any wing is extremely sensitive to its center of pressure distribution, and a small percentage variation in the latter is of major significance.

Since analytical or theoretical solutions for the calculation of a matrix of areodynamic influence coefficient do not yield sufficiently accurate results, it would be desirable to utilize a model of an actual wing in a wind tunnel, as part of a procedure for the accurate determination of the matrix of aerodynamic influence coefficients.

What is needed, therefore, and comprises the primary object of this invention is to provide a procedure for determining the matrix of aerodynamic influence coefficients which involves inserting a plurality of arbitrarily distorted wing configurations in a wind tunnel to obtain the required information.

The method and apparatus used herein to obtain the aerodynamic influence coefficients is a compromise between the ideal of a large number of translating boxes or panels, and the practical requirements of a small number of interconnected surfaces. The technique of evaluating the influence coefficient is described below.

The invention in its broadest aspect comprises forming a solid steel rigid force test model of the wing, along with a flexible assembly of configurations, and the interchangeability of component assemblies for simulation of arbitrary downwashes or angles of attack. This model, along with instruments for measuring chordwise moments, spanwise moments, and the lift of various components is mounted in a wind tunnel. The arbitrary downwashes or angles of attack are simulated by splitting the wing into various sections with each of the sections simulating three types of downwashes. By measuring the loading over predetermined portions of a sufficiently large number of wing configurations in a wind tunnel, sufficient information can be obtained for determining the complete matrix of aerodynamic influence coefficients.

This and other objects of this invention will become more apparent when understood in the light of the accompanying specification and drawings; wherein.

FIGURE 13 is a perspective view of the blank used forming the planar wing configuration.

Figure 1:
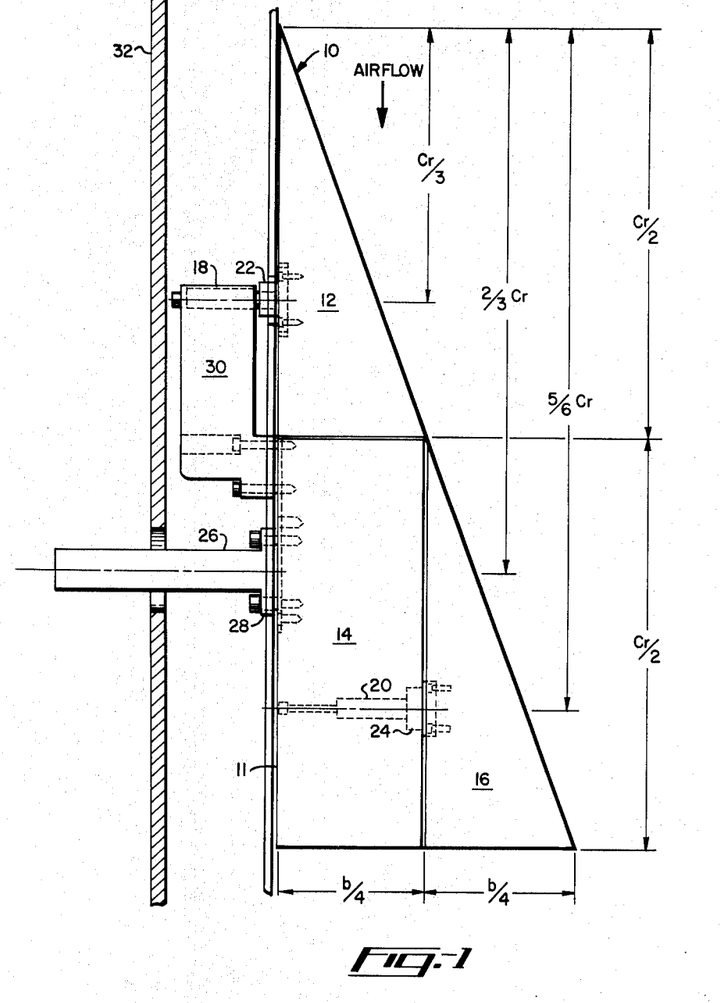
FIGURE 1 is a plan view of a sample half-span delta wing model adapted to be mounted inside of a wind tunnel.

Referring now to FIGURE 1 of the drawings, a typical wing model which in the drawing comprises a half-span 70° delta wing 10 is, in this particular embodiment, formed from three separate elements, section 14 and flaps 12, and 16. For reasons both of economy of manufacture and for accuracy in the determination of the aerodynamic influence coefficients, forward flap 12 and tip flap 16 are equal in size to each other, and each is one-half the size of section 14, for reasons to become apparent below (see FIGURE 13).

Conventional force balances 18 and 20 are secured to flaps 12 and 16 by means of suitable hinge blocks 22 and 24. In addition, a force balance 26 is secured to section 14 by hinge block 28. In this way the flaps 12 and 16 and section 14 can be removed and replaced for reasons to become apparent below, without disturbing the sensitive balances.

Balances 18 and 20 are positioned on a line chord which passes through the centroids or chordwise center of gravity of flaps 12 and 16, respectively, for reasons to be discussed below. For flaps having a triangular shape, as shown, these balances are each located ⅔ of the distance down from the apex of the triangle, as shown in FIGURE 1. Similarly, balance 26 is located on a line passing through the centroid of the wing flap as a whole so that balance 26 is located at a distance ⅔$C_r$ from the top of the wing, where $C_r$ is the chord length. Each balance consists of two sets of temperature compensated strain gages placed far enough apart so that accurate center of pressure locations are possible, in a manner well-known in the art.

With this arrangement, balances 18 and 20 each measure three independent factors or numbers. These are the chordwise moment $M_L$, the spanwise moment $M_C$, and the lift L of flaps 12 and 16, respectively, when the half-span wing is in an operating wind tunnel. Similarly, balance 26 measures the chordwise moment, the spanwise moment, and the lift of the wing span as a whole.

As shown in FIGURE 1, balance 18 is mounted on an arm 30 which is secured to section 14. Similarly, balance 20 is also supported on section 14. As a result, section 14 serves as a common support or base for flaps 12 and 16. Consequently, by simple subtraction, the chordwise moment, the spanwise moment, and the lift, can be determined for section 14. By locating the balances at the chordwise center of gravity, any initial angle of attack due to model weight is substantially eliminated, thereby increasing the accuracy of measurement.

As explained above, three independent factors or numbers are known about each flap and section. Consequently, each flap or section may be arbitrarily subdivided and the magnitude of the lift at the centroid of each arbitrary subdivision can be determined. For example, referring to flap 12, the magnitude of the total lift $L_{12}$, the chordwise moment $M_{C_{12}}$, and the spanwise moment $M_{S_{12}}$, are known from balance 18. If this flap is divided into three imaginary or arbitrary parts, 1, 2, and 3, as indicated by the dotted separation lines in FIGURE 2, and if the lift over each imaginary subdivision is assumed constant and concentrated at the centroid of the subdivision, and if $l_1$ is a lift due to part 1 and $l_2$ is a lift due to part 2, and $l_3$ is a lift due to part 3, then $$L_{12} = l_1 + l_2 + l_3 \quad (1)$$

Figures 2, 3, 4, 5:
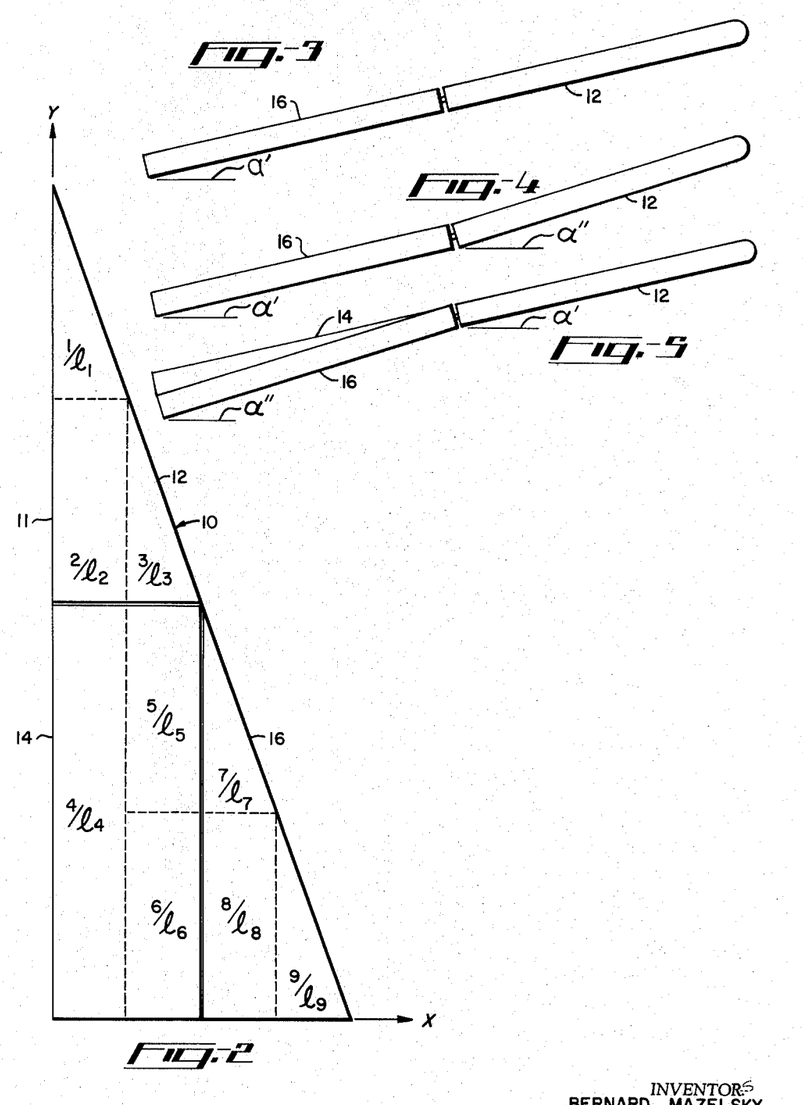
FIGURE 2 is a plan view of a half-span delta wing model shown in FIGURE 1, with each of the wing segments subdivided into arbitrary sub-segments.
FIGURE 3 is a side view of the half-span delta wing with all the wing segments planar, and mounted in a wind tunnel at an angle of attack $\alpha'$.
FIGURE 4 is a side view of an articulated wing assembly configuration with wing flap 12 planar and at an angle of attack $\alpha''$; while the remaining sections of the wing are planar and at an angle of attack $\alpha'$.
FIGURE 5 is a side view of a half-span delta wing with planar wing flap 12 and planar section 14 at angle of attack $\alpha'$ while planar wing flap 16 is articulated at an angle of attack $\alpha''$.

Since we are assuming that $l_1$, $l_2$ and $l_3$ each act at the centroid of an imaginary section, then each of the lifts will exert an effect on the spanwise moment $M_{S_{12}}$ and the chordwise moment $M_{C_{12}}$ of the flap 12. Hence, $$M_{C_{12}} = a l_1 + b l_2 + c l_3 \quad (2)$$

and $$M_{S_{12}} = d l_1 + e l_2 + f l_3 \quad (3)$$

Since the location of the centroids of sections 1, 2, and 3 are known from the geometry of the sections, the symbols $a$, $b$, $c$, $d$, $e$, and $f$, represent distances of these centroids from the chordwise and spanwise center of gravity of flap 12. Hence, $a$, $b$, $c$, $d$, $e$, and $f$ represent known numbers.

Consequently, Equations 1, 2, and 3 can be solved in terms of $l_1$, $l_2$, and $l_3$. As a result, the measurements indicated by the force balance 18 can be used to calculate $l_1$, $l_2$, and $l_3$.

Similarly, section 14 can be arbitrarily subdivided into three imaginary sections, 4, 5, and 6, as indicated by the dotted separation lines in FIGURE 2. If the lift of each arbitrary section is assumed constant over the section, then $l_4$ represents the lift due to part 4, $l_5$ represents the lift due to part 5, and $l_6$ represents the lift due to part 6.

As explained above, the lift $L_{14}$, the chordwise moment $M_{C_{14}}$, and the spanwise moment $M_{S_{14}}$ for wing section 14 are all determined by the balances 18, 20, and 26. Consequently, for the reasons described above $l_4$, $l_5$ and $l_6$ are known. Similarly, flap 16 can be arbitrarily subdivided into three imaginary sections, 7, 8, and 9, each contributing lift $l_7$, $l_8$, and $l_9$, respectively. Similarly, the lift $L_{16}$, the spanwise moment $M_{S_{16}}$, and the chordwise moment $M_{C_{16}}$ for wing flap 16 are measured by balance 20.

This permits the lifts $l_7$, $l_8$, and $l_9$, of wing flap 16, to be calculated.

Although the imaginary subdivision of the wing flaps 12 and 16 and section 14 has been indicated as arbitrary, common sense suggests that the divisions be made in such a way as to provide a generally uniform distribution of the aerodynamic effects on the wing caused by these arbitrary subdivisions. Accordingly, divisions 1, 2, and 3 in forward flap 12 and divisions 7, 8, and 9, in flap 16, have been divided in the same way as the half-span wing has been actually divided.

With respect to the arbitrary division of rectangular section 14, it is apparent that the portion of wing section 14 nearest median line 11 of the wing, will have the least aerodynamic effect. Consequently, the entire wing section 14 has been divided in half to form section 4 while the remaining half of section 14 has been divided again in half, as shown, to form sections 5 and 6. In this way, the aerodynamic effects of sections 4, 5, and 6 on wing section 14 are generally uniformly distributed.

For any wing, the lift produced by any arbitrary segments is determined by the shape of the segment, its angle of attack, and the contribution of all other segments of the wing. It can further be shown by aerodynamic theory that the lift from all the segments of the wing can be expressed by the following matrix:

$$\{l\} = [Q] \{\alpha\} \quad (4)$$

where $l$ is the lift of any one segment of the wing, $\{\alpha\}$ is the angle of attack distribution of the segments, and $[Q]$ represents the influence coefficients of the segments.

The importance of the above matrix is evident, because if the influence coefficients are once determined, the lift of the various segments of the wing is determined entirely by the angle of attack distribution over a reasonably wide speed range. By knowing the lift, and angle of attack of the various segments of the wing, the flutter characteristics of the wing may be determined, and this is essential for design consideration.

It is apparent that the number of arbitrary wing segments that may be considered in the determination of the aerodynamic influence coefficients may be as large as desired. However, the determination of the aerodynamic influence coefficient from an infinitely, or even very large matrix, as set forth in Equation 4, is obviously impractical.

In practice, it has been found that the aerodynamic influence coefficients from a 9 x 9 matrix are the smallest size which can be used effectively for determining the aerodynamic influence coefficients with sufficient precision to accurately predict flutter and other physical characteristics of the wing. This explains why the half-span wing shown in FIGURES 1 and 2 was arbitrarily divided into nine segments.

As will be explained below, the half-span wing model 10 is used to determine the 9 x 9 matrix of aerodynamic influence coefficients expressed as $$\{l\} = {}^9{}^9[Q] [\alpha] \quad (5)$$

Referring now to FIGURE 2 of the drawings, the lift $l_1$ provided by wing segment 1 is the sum of the effects of the lift of segment 1 by itself and the contribution to the lift of segment 1 by all of the wing segments. In other words, $$l_1 = Q_{11}\alpha_1 + Q_{12}\alpha_2 + Q_{13}\alpha_3 \ldots Q_{19}\alpha_9 \quad (6)$$

where $\alpha_1$ is the angle of attack of segment 1, and $Q_{11}$ is the aerodynamic influence coefficient of segment 1, and $Q_{1j}$, $\alpha_j$ represents the lift contributed to segment 1 by the $j$th segment at an angle of attack $\alpha_j$, and $Q_{1j}$ represents the aerodynamic influence coefficient on segment 1 from the $j$ segment.

Similarly, $l_2$, the lift of segment 2 in flap 12, can be expressed as:

$$l_2 = Q_{21}\alpha_1 + Q_{22}\alpha_2 + Q_{23}\alpha_3 + \ldots Q_{29}\alpha_9 \quad (7)$$

where $\alpha_2$ is the angle of attack of segment 2 and $Q_{2j}$, $\alpha_j$ represents the lift contributed to segment 2 by the $j$ segment at an angle of attack $\alpha_j$, and $Q_{2j}$ represents the influence coefficient on segment 2 from the $j$ segment.

It is apparent, therefore, that the matrix expressed in Equation 5 can be written as $$l_1^1 = Q_{11}\alpha_1 + Q_{12}\alpha_2 + Q_{13}\alpha_3 + \ldots Q_{19}\alpha_9$$
$$l_2^1 = Q_{21}\alpha_1 + Q_{22}\alpha_2 + Q_{23}\alpha_3 + \ldots Q_{29}\alpha_9 \quad (8)$$
$$l_3^1 = Q_{31}\alpha_1 + Q_{32}\alpha_2 + Q_{33}\alpha_{3k} + \ldots Q_{39}\alpha_9$$
$$l_4^1 \ldots$$
$$l_5^1 \ldots$$
$$\vdots$$
$$l_9^1 = Q_{91}\alpha_1 + Q_{92}\alpha_2 + Q_{93}\alpha_3 + \ldots Q_{99}\alpha_9$$

The above represents nine linear equations in eighty-one unknown aerodynamic influence coefficients which are to be determined by using the half-span wing model shown in FIGURE 1 in the manner described below.

If the half-span wing 10 has a planar configuration, it may be inserted in a wind tunnel 32, and the angle of attack $\alpha$ will be a constant over flaps 12 and 16 and section 14 (see FIGURE 3). When the wind tunnel is operated with this wing configuration, balances 18, 20, and 26 will permit the lift $l_1$ to $l_9$ of sections 1 to 9 to be calculated, as described above. Hence, $l_1$ to $l_9$ are known. In addition, with a planar wing configuration, the angle of attack will have a known measurable value $\alpha'$. Hence $\alpha_1 = \alpha_2 = \alpha_3 = \alpha_4 = \alpha_5 \ldots = \alpha_9 = \alpha'$. Consequently, Equations 8 may be written as $$l_1^1 = \alpha' \sum_1^9 Q_{1j}$$
$$l_2^1 = \alpha' \sum_1^9 Q_{2j}$$
$$l_3^1 = \alpha' \sum_1^9 Q_{3j} \quad (9)$$
$$\vdots$$
$$l_9^1 = \alpha' \sum_1^9 Q_{9j}$$

where the superscript over the $l$'s means that this is the first measured set of 9 linear equations in eighty-one unknown aerodynamic influence coefficients.

If we are interested in determining the influence coefficient, Equations 9 may be better written as $$\sum_1^9 Q_{1j} = \frac{l_1^1}{\alpha'}$$
$$\sum_1^9 Q_{2j} = \frac{l_2^1}{\alpha'}$$
$$\sum_1^9 Q_{3j} = \frac{l_3^1}{\alpha'} \quad (10)$$
$$\vdots$$
$$\sum_1^9 Q_{9j} = \frac{l_9^1}{\alpha'}$$

The wing flaps 12 and 16 and section 14 are detachably connected together by means of conventional hinge blocks 22, 24, and 28. Hence, wing flap 12 may be secured to section 14 at a known angle of attack $\alpha'''$, by selecting a hinge block with an appropriate angle. Hence, for forward flap 12 only $\alpha_1 = \alpha_2 = \alpha_3 = \alpha'''$.

When this is done, the half-span wing will have an articulated configuration, as shown in FIGURE 4. If the articulated configuration is again inserted in a wind tunnel with flap 16 and section 14 at a known angle of attack $\alpha'$, balances 18, 20, and 26 provide another set of values for the "$l$'s." Hence, Equations 8 may be written as:

$$l_1^2 = \alpha'''(Q_{11} + Q_{12} + Q_{13}) + \alpha'(Q_{14} + Q_{15} \ldots Q_{19})$$
$$l_2^2 = \alpha'''(Q_{21} + Q_{22} + Q_{23}) + \alpha'(Q_{24} + Q_{25} \ldots Q_{29})$$
$$l_3^2 = \alpha'''(Q_{31} + Q_{32} + Q_{33}) + \alpha'(Q_{34} + Q_{35} \ldots Q_{39}) \quad (11)$$
$$\vdots$$
$$l_9^2 = \alpha'''(Q_{91} + Q_{92} + Q_{93}) + \alpha'(Q_{94} + Q_{95} \ldots Q_{99})$$

where the superscript 2 over the $l$'s means that this is the second set of nine linear equations in eighty-one unknown aerodynamic influence coefficients.

In a similar manner, forward flap 12 and section 14 may be reconnected so they both have the initial angle of attack $\alpha'$ while tip flap 16 is reconnected to section 14 at any arbitrary angle of attack which, for convenience, has again been chosen as $\alpha'''$ (see FIGURE 5).

If this wing configuration is inserted in a wind tunnel 32, balances 18, 20, and 26 provide a new set of values of the $l$'s. Hence, Equations 8 can be written as:

$$l_1^3 = \alpha'[Q_{11} + Q_{12} \ldots Q_{16}] + \alpha'''[Q_{17} + Q_{18} + Q_{19}]$$
$$l_2^3 = \alpha'[Q_{21} + Q_{22} \ldots Q_{26}] + \alpha'''[Q_{27} + Q_{28} + Q_{29}]$$
$$l_3^3 = \alpha'[Q_{31} + Q_{32} \ldots Q_{36}] + \alpha'''[Q_{37} + Q_{38} + Q_{39}] \quad (12)$$
$$\vdots$$
$$l_9^3 = \alpha'[Q_{91} + Q_{92} \ldots Q_{96}] + \alpha'''[Q_{97} + Q_{98} + Q_{99}]$$

To this point, by using a planar wing, with articulated wing flaps, three sets of nine linear equations in eighty-one unknown aerodynamic influence coefficients have been determined. These are Equations 10, 11, and 12, described above. It can be shown from theoretical considerations that any attempt to increase the number of sets of linear equations by further articulations of the planar wing will lead to redundancies in the ulitmate matrix, and so will not be helpful in determining the eighty-one independent aerodynamic influence coefficients necessary for a practical understanding of the wing behavior. In other words, wing configurations are required where the angle of attack distribution is not uniform over the surface of the individual flap and sections. Mathematically, this means that $$\alpha_j = f_j(x, y) \quad (13)$$

where $x$ is in the chordwise direction and
$y$ is in the spanwise direction whereas for a planar articulated wing configuration, $\alpha$ equals a constant.

Although the particular $f_j(x, y)$ available for use is arbitrary, there is a restriction that the values of $\alpha_j$ be independent of each other in order to avoid redundancies in the matrix and to insure the independence of the aerodynamic influence coefficients being determined. In order to insure the independence of the angles of attack distributions, we can select one group of $\alpha$'s where:

$$\alpha_j = f_j(x, c) \quad (14)$$

where $y$ is a constant $c$ and another group of $\alpha$'s where:

$$\alpha_j = f_j(k, y) \quad (15)$$

and $x$ is a constant $k$.

Figures 10, 12A:
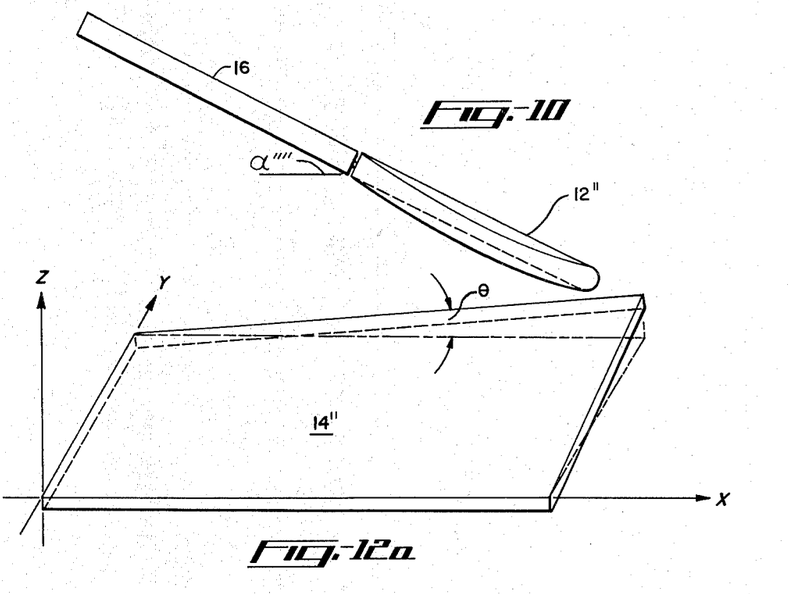
FIGURE 10 is a side view of a wing configuration wherein section 14 and wing flap 16 are planar and at an angle of attack $\alpha''''$ while connected to wing flap 12" which is provided with a linear twist.
FIGURES 12(a) and 12(b) disclose wing section 14" and wing flap 12" and section 16" machined with a linear twist.
Figure 10:
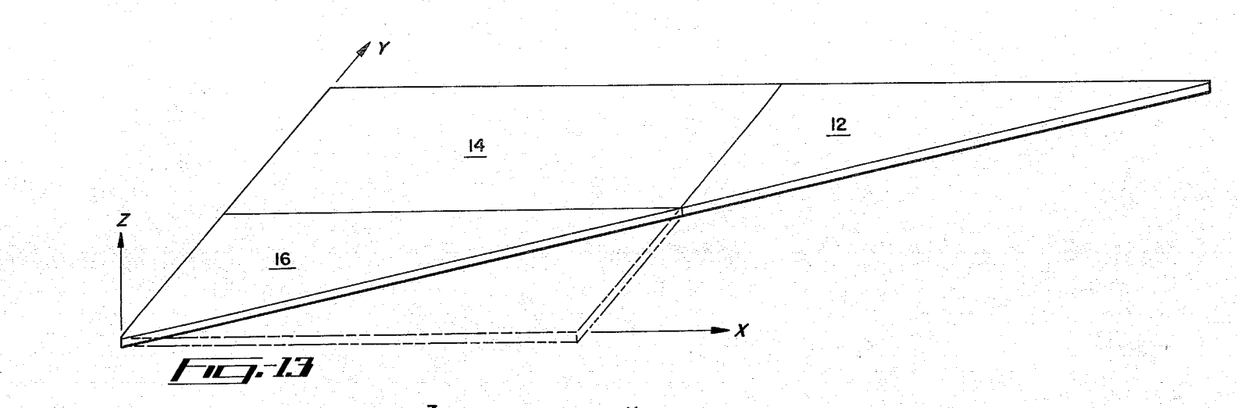
Figure 11:
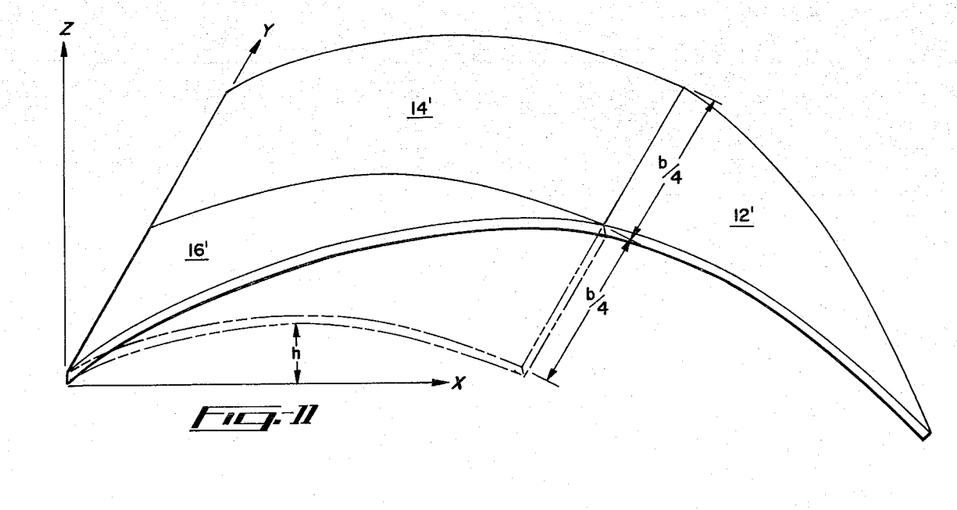
FIGURE 11 is a perspective view of a metal blank used in forming a completely parabolic wing.
Figure 12B:
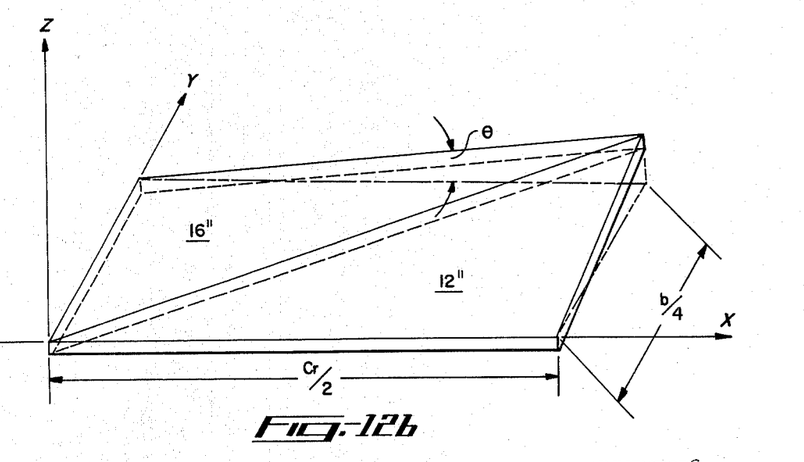

With this arrangement, $\alpha$'s determined from wing configurations according to Equation 14 will be entirely independent from the α's determined from wing configurations according to Equation 15 (see FIGURES 11, 12a and 12b).

Although the form of Equation 14 is arbitrary, common sense would suggest that the function be as simple as possible for convenience of manufacture.

In accordance with this view, a wing having a parabolic camber, which simulates the rate of pitch, would provide the simplest of function, both from a mathematical and a manufacturing point of view. In particular, referring to FIGURE 11, a solid metal blank with initially parallel sides and ends is cut according to the function $$Z = \left[1 - \left(1 - \frac{4x}{C_r}\right)^2\right] h \qquad (16)$$

where $C_r$ and $h$ are the dimensions indicated in FIGURES 1 and 11.

When the blank is formed, flaps 12 and 16 are separated from section 14, with flap 12 shifted from its dotted line position and connected to section 14 in the solid line position shown. It is apparent that section 14 and flaps 12 and 16 are formed from one simple machining operation, and since this shape is parabolic, machining will be simple.

From aerodynamic considerations, it can be shown that the angle of attack α is proportional to $$\frac{dz}{dx} \qquad (17)$$

where $z$ is a direction perpendicular to $x$ and $y$. A consideration of Equation 16 indicates that α is a linear function of $x$.

Figure 6:
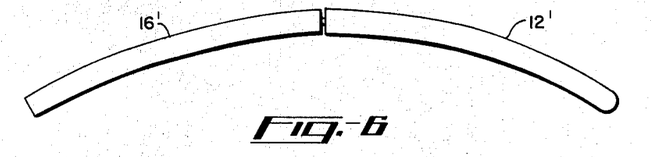
FIGURE 6 is a side view of the half-span delta wing shown in FIGURE 1 and with a completely parabolic camber.

Referring again to FIGURE 2, since the value of $x$ at the centroid of each arbitrary subsection is known from strictly geometrical considerations, the value of α at the centroid of a parabolic section is known. Experience has shown that an assumption that the angle of attack α is uniform over each arbitrary subdivision will not introduce appreciable error into the resultant evaluation of the aerodynamic influence coefficient. With this in mind, if an entire wing, curved parabolically according to Equation 16 and comprising section 14' and forward flap 12' and tip flap 16', is then inserted in a wind tunnel (see FIGURES 6 and 11), a new set of $l$'s for each arbitrary subdivision will be determined. Using the known angle of attack at the centroid of each arbitrary subdivision, a new set of nine equations can be written as:

$$l_1^4 = Q_{11}\alpha_1^p + Q_{12}\alpha_2^p + Q_{13}\alpha_3^p \ldots Q_{19}\alpha_9^p$$
$$l_2^4 = Q_{21}\alpha_1^p + Q_{22}\alpha_2^p + Q_{23}\alpha_3^p \ldots Q_{29}\alpha_9^p$$
$$l_3^4 = Q_{31}\alpha_1^p + Q_{32}\alpha_2^p + Q_{33}\alpha_3^p \ldots Q_{39}\alpha_9^p \qquad (18)$$
$$\vdots$$
$$l_9^4 = Q_{91}\alpha_1^p + Q_{92}\alpha_2^p + Q_{93}\alpha_3^p \ldots Q_{99}\alpha_9^p$$

where $p$ in the superscript of the α's indicates that each α is known, and that the α's relate to a parabolic wing.

Figure 7:
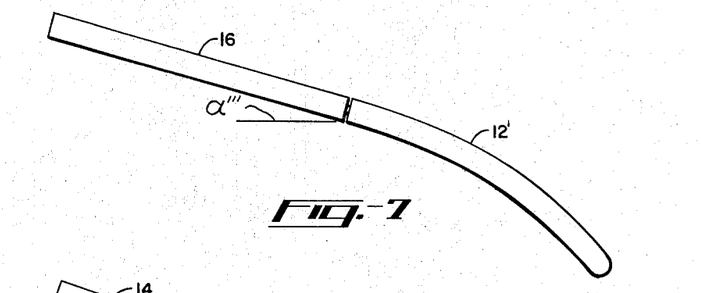
FIGURE 7 is a side view of a configuration of the half-span delta wing of FIGURE 1 with section 14 and wing flap 16 planar and at an angle of attack $\alpha'''$ while a parabolic section 12' is connected to wing section 14.

Next, a wing configuration is assembled with planar section 14, planar tip flap 16, and parabolically curved forward flap 12' (see FIGURE 7). Since the values of $\alpha_1^p$, $\alpha_2^p$, and $\alpha_3^p$ are known for flap 12', as indicated in connection with Equation 18, after the wind tunnel results from the wing configurations shown in FIGURE 7 are measured, the following equations can be written.

$$l_1^5 = Q_{11}\alpha_1^p + Q_{12}\alpha_2^p + Q_{13}\alpha_3^p + \alpha'''[Q_{14} + Q_{15} \ldots Q_{19}]$$
$$l_2^5 = Q_{21}\alpha_1^p + Q_{22}\alpha_2^p + Q_{23}\alpha_3^p + \alpha'''[Q_{24} + Q_{25} \ldots Q_{29}]$$
$$l_3^5 = Q_{31}\alpha_1^p + Q_{32}\alpha_2^p + Q_{33}\alpha_3^p + \alpha'''[Q_{34} + Q_{35} \ldots Q_{39}] \qquad (19)$$
$$\vdots$$
$$l_9^5 = Q_{91}\alpha_1^p + Q_{92}\alpha_2^p + Q_{93}\alpha_3^p + \alpha'''[Q_{94} + Q_{95} \ldots Q_{99}]$$

where α''' represents the angle of attack of planar section 14 and planar tip flap 16.

Figure 8:
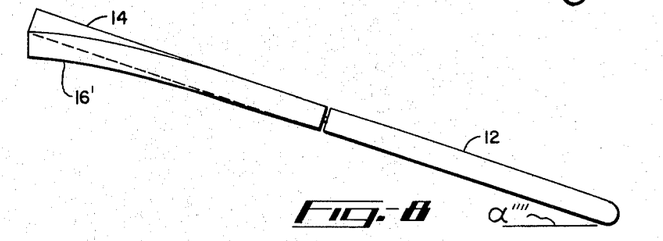
FIGURE 8 is a side view of a half-span delta wing configuration wherein wing flap 12 and section 14 are planar and at an angle of attack $\alpha''''$ while wing flap 16' is connected to wing section 14 and has a parabolic camber.

Similar, a wing configuration is assembled with planar section 14, planar forward flap 12, and parabolic tip flap 16' (see FIGURE 8). When this wing configuration is inserted in a wind tunnel, the results produce the following set of equations:

$$l_1^6 = \alpha''''[Q_{11} + Q_{12} \ldots Q_{16}] + \alpha_7^p Q_{17} + \alpha_8^p Q_{18} + \alpha_9^p Q_{19}$$
$$l_2^6 = \alpha''''[Q_{21} + Q_{22} \ldots Q_{26}] + \alpha_7^p Q_{27} + \alpha_8^p Q_{28} + \alpha_9^p Q_{29}$$
$$l_3^6 = \alpha''''[Q_{31} + Q_{32} \ldots Q_{36}] + \alpha_7^p Q_{37} + \alpha_8^p Q_{38} + \alpha_9^p Q_{39} \qquad (20)$$
$$\vdots$$
$$l_9^6 = \alpha''''[Q_{91} + Q_{92} \ldots Q_{96}] + \alpha_7^p Q_{97} + \alpha_8^p Q_{98} + \alpha_9^p Q_{99}$$

where α'''' is the angle of attack of planar wing section 14. Then, planar forward flap 12 and $\alpha_7^p$, $\alpha_8^p$, and $\alpha_9^p$ are determined as indicated in connection with Equations 18.

Since three sets of equations have been written from wing configurations based on parabolically curved segments, further parabolic wing configurations would produce redundancies in the matrix that would not be helpful in determining sets of independent influence coefficients.

Figure 9:
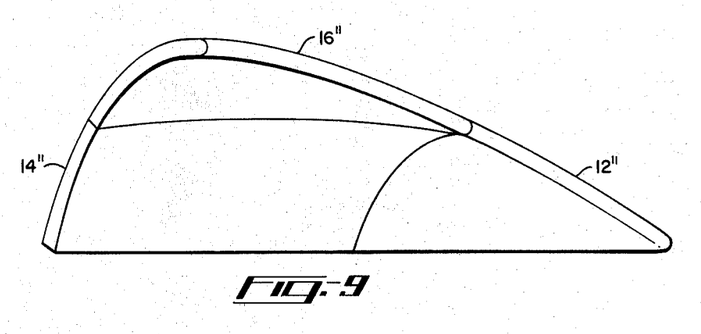
FIGURE 9 is a perspective view of the half-span delta wing with a linear twist.

To prevent these redundancies, new wing configurations are required where the values of α are functions of $y$ alone, according to Equation 15. From the point of view of simplicity, a wing having a linear twist would provide the simplest function, both from a mathematical point of view and from a manufacturing point of view. In particular, referring to FIGURES 9, 12a, and 12b, two solid metal blanks with parallel sides and ends are machined with a twist according to the function $$Z = \frac{4xy}{b}\theta_{max} \qquad (21)$$

where $\theta_{max}$ is the maximum twist angle. Since α is proportional to $dz/dx$, it is apparent that α is a function of $y$ alone.

It is noted from FIGURES 12a and 12b that although the twisted wing has been formed from two separate blanks, this is only for convenience in machining, and the wing could be machined from a single blank with a proper twist. However, this would be considerably more expensive.

If an entirely twisted wing (simulating a spanwise angle of attack) is formed according to Equation 21 with twisted section 14'', twisted forward flap 12'' and twisted tip flap 16'', and if this wing is then inserted in a wind tunnel, upon selecting the values of α at the centroids of these twisted pieces, as described in connection with the parabolically curved wing, a value of $\alpha^T$ for each arbitrarily divided and twisted wing section is known. Hence, for an entirely twisted wing, as shown in FIGURE 9, the following equations can be written:

$$l_1^7 = Q_{11}\alpha_1^T + Q_{12}\alpha_2^T + Q_{13}\alpha_3^T + \ldots Q_{19}\alpha_9^T$$
$$l_2^7 = Q_{21}\alpha_1^T + Q_{22}\alpha_2^T + Q_{23}\alpha_3^T + \ldots Q_{29}\alpha_9^T$$
$$l_3^7 = Q_{31}\alpha_1^T + Q_{32}\alpha_2^T + Q_{33}\alpha_3^T + \ldots Q_{39}\alpha_9^T \qquad (22)$$
$$\vdots$$
$$l_9^7 = Q_{91}\alpha_1^T + Q_{92}\alpha_2^T + Q_{93}\alpha_3^T + \ldots Q_{99}\alpha_9^T$$

where the superscript T indicates that the values of α for the particular arbitrarily divided and twisted wing section are known.

Next, a wing configuration is formed using planar section 14, planar flap 16 with twisted forward flap 12'' (see FIGURE 10). This produces the following equations:

$$l_1^8 = Q_{11}\alpha_1^T + Q_{12}\alpha_2^T + Q_{13}\alpha_3^T$$
$$+ \alpha''''[Q_{14} + Q_{15} + \ldots Q_{19}]$$
$$l_2^8 = Q_{21}\alpha_1^T + Q_{22}\alpha_2^T + Q_{23}\alpha_3^T$$
$$+ \alpha''''[Q_{24} + Q_{25} + \ldots Q_{29}]$$

$$l_3^8 = Q_{31}\alpha_1^T + Q_{32}\alpha_2^T + Q_{33}\alpha_3^T$$
$$+ \alpha''''[Q_{34} + Q_{35} + \ldots Q_{39}] \quad (23)$$

.
.
.

$$l_9^8 = Q_{91}\alpha_1^T + Q_{92}\alpha_2^T + Q_{93}\alpha_3^T$$
$$+ \alpha''''[Q_{94} + Q_{95} + \ldots Q_{99}]$$

where $\alpha_1^T$, $\alpha_2^T$, and $\alpha_3^T$ are known from the considerations set forth in connection with Equations 22 and $\alpha''''$ is the angle of attack of planar section 14 and flap 16.

Finally a wing configuration is formed from planar flap 12, planar section 14, and twisted flap 16''. This configuration yields the following set of equations:

$$l_1^9 = \alpha'''''[Q_{11} + Q_{12} + \ldots Q_{16}]$$
$$+ \alpha_7^T Q_{17} + \alpha_8^T Q_{18} + \alpha_9^T Q_{19}$$
$$l_2^9 = \alpha'''''[Q_{21} + Q_{22} + \ldots Q_{26}]$$
$$+ \alpha_7^T Q_{27} + \alpha_8^T Q_{28} + \alpha_9^T Q_{29}$$
$$l_3^9 = \alpha'''''[Q_{31} + Q_{32} + \ldots Q_{36}]$$
$$+ \alpha_7^T Q_{37} + \alpha_8^T Q_{38} + \alpha_9^T Q_{39} \quad (24)$$

.
.
.

$$l_9^9 = \alpha'''''[Q_{91} + Q_{92} + \ldots Q_{96}]$$
$$+ \alpha_7^T Q_{97} + \alpha_8^T Q_{98} + \alpha_9^T Q_{99}$$

where $\alpha'''''$ is the angle of attack of planar section 14 and planar flap 12 and $\alpha_7^T$, $\alpha_8^T$, and $\alpha_9^T$, are determined from the development of Equations 22.

In summary to this point, equations sets 9, 11, 12, 18, 19, 20, 22, 23, and 24, represent a total of eighty-one linear equations in eighty-one unknown aerodynamic influence coefficients. Consequently, the 9 x 9 matrix of aerodynamic influence coefficients is determined and the eighty-one aerodynamic influence coefficients in the matrix expressed in Equation 5 can be calculated.

By proper selection of the wing articulations, camber, and twist distortions, the resultant aerodynamic influence coefficients will be independent of each other. In this connection, however, it is necessary that the separation lines between flap 12 and section 14, and between section 14 and flap 16 be either perpendicular or parallel to the air flow to make certain that the values measured by the force balances are independent of each other.

By providing additional parabolic wing forms or cambers and twists of great amplitude, the stability of the aerodynamic influence coefficients can be determined for various arbitrary distortions. In other words, the calculations described above would be repeated for wing configurations using cambers of greater amplitude and twists of greater amplitude. In addition, the effect of varying Mach number, air density, air temperature, etc. on the aerodynamic influence coefficients can be easily investigated in the wind tunnel.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. The method of determining the aerodynamic influence coefficients of a wing comprising the steps of forming a number of independent configurations of a model of the wing, subdividing each configurations in such a way that the subdivisions of one wing configuration can be interchanged with a subdivision of another wing configuration to form a flexible assembly of wing configurations and interchangeable component assemblies wherein each of the resulting number of wing configurations simulates an independent angle of attack distribution, inserting in sequence each of the resulting wing configurations in a wind tunnel, and instrumenting each wing configuration so that the lift of at least a number of different portions of each wing configuration can be measured, whereby by knowing the lift at various portions of each wing configuration, and the angle of attack of those portions, and determinating this information for a sufficient number of independent configurations of the model of the wing, the areodynamic influence coefficients can be calculated.

2. The method of determining the aerodynamic influence coefficients of a wing comprising the steps of forming a number of independent configurations of a model of the wing, subdividing each wing configuration along lines parallel to and perpendicular to the direction of air flow, and in such a way that the subdivisions of one wing configuration can be interchanged with a subdivision of another wing configuration, to form a flexible assembly of wing configurations and interchangeable component assemblies wherein each of the resulting number of wing configurations simulates an iidependent angle of attack distribution, inserting in sequence each of the resulting wing configurations in a wind tunnel, and instrumenting each wing configuration so that the lift of at least said resulting number of different portions of each wing configuration can be measured, whereby by knowing the lift at various portions of each wing configuration and the angle of attack of these portions, and determining this information for a sufficient number of independent configurations of the model of the wing, the aerodynamic influence coefficients can be calculated.

3. The method of determining the aerodynamic influence coefficients of a wing comprising the steps of forming a planar configuration of a model of the wing, forming a model of the wing with a parabolic camber, and forming a model of the wing with a linear spanwise twist, subdividing each wing configuration along lines parallel to and perpendicular to the direction of air flow and in such a way that the subdivisions of one wing configuration can be interchanged with a subdivision of another wing configuration to form a flexible assembly of wing configurations and interchangeable component assemblies wherein each of the resulting number of wing configurations simulates an independent angle of attack distribution, inserting in sequence each of the resulting wing configurations in a wind tunnel, and instrumenting each wing cofiguration so that the lift of a number of different portions of each wing configuration can be measured, whereby by knowing the lift at various portions of each wing configuration and the angle of attack of these portions, and determining this information for a sufficient number of independent configurations of the model of the wing, the areodynamic influence coefficients can be calculated.

4. The method of determining the areodynamic influence coefficients of a wing comprising the steps of forming a planar configuration of a model of the wing, forming a model of the wing with a parabolic camber, and forming a model of the wing with a linear spanwise twist, subdividing each wing configuration along lines parallel to and perpendicular to the direction of air flow, and in such a way that subdivisions of one wing configuration can be interchanged with a subdivision of another wing configuration to from a flexible assembly of independent wing configurations and interchangeable component assemblies wherein each of the resulting number of wing configurations comprises a plurality of segments connected together to simulate independent angles of attack distributions, inserting in sequence each of the resulting wing configurations in a wind tunnel, and connecting force balances to each segment of the wing configuration whereby the lift over said resulting number of portions of each wing configuration can be measured so that by knowing the lift at various portions of each wing configuration and the angle of attack of these portions, and by determining this information for a sufficient number of aerodynamically independent configurations of the model of the wing, the aerodynamic influence coefficients can be determined.

5. The method of determining the aerodynamic influence coefficients of a wing comprising the steps of forming a planar configuration of a model of the wing, forming a model of the wing with a parabolic camber and forming a model of the wing with a linear spanwise twist, subdividing each wing configuration along lines parallel to and perpendicular to the direction of air flow, providing means for removably attaching various segments of the wing to a base segment of the wing whereby the subdivisions of one wing configuration can be interchanged with a subdivision of another wing configuration to form a flexible assembly of independent wing configurations wherein each of the resulting number of wing configurations comprises a plurality of segments connected together to form independent angles of attack distributions, inserting in sequence each of the resulting wing configurations in a wind tunnel, and connecting force balances to each segment of the wing configuration so each balance lies along a line passing through the centroid of the attached segment, whereby the lift over portions of each wing configuration can be measured, so that by knowing the lift over these portions of the wing configuration and the angle of attack of these portions, and by determining this information for a sufficient number of aerodynamically independent configurations of the model of the wing, the aerodynamic influence coefficients can be calculated.

6. The method of determining the aerodynamic influence coefficients of a delta wing comprising the steps of forming a planar configuration of a half-span model of the wing, forming a half-span model of the wing with a parabolic camber, and forming a half-span model of the wing with a linear spanwise twist, subdividing each wing configuration along lines parallel to and perpendicular to the direction of air flow and in such a way as to form a rectangular base section and triangular forward and tip flap sections with the forward and tip flap sections each equal in size to each other and each equal to one-half the size of the rectangular base section, providing means for interchanging the subdivisions of one configuration with a subdivision of another wing configuration to form a flexible assembly of wing configurations and interchangeable component assemblies wherein each of the resulting number of wing configurations simulates an independent angle of attack distribution, inserting in sequence each of the resulting wing configurations in a wind tunnel, and instrumenting each wing configuration so that the lift of a number of different portions of each wing configuration can be measured, whereby by knowing the lift at various portions of each wing configuration and the angle of attack of these portions, and determining this information for a sufficient number of independent configurations of the model of the wing, the aero-dynamic influence coefficients can be calculated.

7. The method of determining the aerodynamic influence coefficients of a delta wing comprising the steps of forming a planar configuration of a half-span model of the wing, forming a half-span model of the wing with a parabolic camber, and forming a half-span model of the wing with a linear spanwise twist, subdividing each wing configuration along lines parallel to and perpendicular to the direction of air flow and in such a way as to form a rectangular base section and triangular forward and tip flap sections with the forward and tip flap sections each equal in size to each other and each equal to one-half the size of the rectangular base section, providing means for removably attaching the forward and tip flap sections to the base section whereby the subdivisions of one configuration can be interchanged with a subdivision of another wing configuration to form a flexible assembly of wing configurations and interchangeable component assemblies wherein each of the resulting number of wing configurations simulates an independent angle of attack distribution, inserting in sequence each of the resulting wing configurations in a wind tunnel, and connecting force balances to each section of the wing configuration so each force balance lines along a line passing through the centroid of the attached section whereby the lift over portions of each wing configuration can be measured so that by knowing the lift at various portions of each wing configuration and the angle of attack of these portions and determining this information for a sufficient number of independent configurations of the model of the wing, the aerodrnamic influence coefficients can be computed.

8. The method of determining the stability of the aerodynamic influence coefficients of a delta wing, comprising the steps of forming a planar configuration of a half-span model of the wing, forming a half-span model of the wing with a first parabolic camber, and forming a half-span model of the wing with a first linear spanwise twist, subdividing each wing configuration along lines parallel to and perpendicular to the direction of air flow and in such a way as to form a rectangular base section and triangular, forward, and tip flap sections with the forward and tip flap sections each equal in size to each other and each equal to one-half the size of the rectangular base section, providing means for removably attaching the forward and tip flap sections to the base section, whereby the subdivisions of one configuration can be interchanged with the subdivision of another configuration to form a flexible assembly of wing configurations and interchangeable component assemblies wherein each of the resulting number of wing configurations simulates an independent angle of attack distribution, inserting in sequence each of the resulting wing configurations in a wind tunnel, connecting force balances to each section of the wing configuration so each force balance lies along the line passing through the centroid of the attached section whereby the lift over portions of each wing configuration can be measured, so that by knowing the lift at various portions of each wing configuration and the angle of attack of these portions, and determining this information for a sufficient number of independent configurations of the model of the wing, the aerodynamic influence coefficients can be computed, then forming a half-span model of the wing with a second parabolic camber having a different amplitude than the amplitude of the first parabolic camber and forming a half-span model of the wing with a second linear spanwise twist different than the first linear spanwise twist, repeating the method of determining the aerodynamic influence coefficients using the second parabolic camber and the second linear spanwise twist for recomputing the aerodynamic influence coefficents, and comparing the recomputed values of the aerodynamic influence coefficients with the original values to determine the extent of any variation.

9. The method of determining the aerodynamic influence coefficients of a delta wing by developing the 9 x 9 matrix $$\{l\} = 9^9 [Q] \{\alpha\}$$

where $l$ is the lift at various portions of the wing,
$\alpha$ is the angle of attack distribution of the wing,
and Q is the aerodynamic influence coefficients;

comprising the steps of forming a planar configuration of a half-span model of the wing, forming a half-span model of the wing with a parabolic camber, and forming a half-span model of the wing with a linear spanwise twist, subdividing each wing configuration along lines parallel to and perpendicular to the direction of air flow and in such a way as to form a rectangular base section and triangular forward and tip flap sections with the forward and tip flap sections each equal in size to each other and each equal to one-half the size of the rectangular base section, providing means for removably attaching the forward and tip flap sections to the base section whereby the subdivisions of one configuration can be interchanged with a subdivision of another wing configuration to form a flexible assembly of at least nine wing configurations wherein each of the wing configurations simulates an independent angle of attack distribution, inserting in sequence each of the at least nine wing configurations in a wind tunnel, and connecting force balances to each section of the wing configuration so each force balance lies along a line passing through the centroid of the attached section whereby the lift over at least nine portions of each wing configuration can be measured, so that by knowing the lift at said at least nine portions of each wing configuration and knowing the angle of attack of these portions, and determining this information for at least nine independent configurations of the model of the wing, a total of eighty-one linear equations in eightly-one unknown aerodynamic influence coefficients may be written so that the eighty-one aerodynamic influence coefficients in the 9 x 9 matrix can be computed.

References Cited by the Examiner

UNITED STATES PATENTS 3,020,754  2/1962  Swanson _____________ 73—147

FOREIGN PATENTS 987,928  4/1951  France.

OTHER REFERENCES

Watkins et al.: "A Systematic Kernal Function Procedure for Determining Aerodynamic Forces on Oscillating or Steady Finite Wings at Subsonic Speeds," NASA Technical Report R 48 (1959), pages 34, 35, 47.

RICHARD C. QUEISSER, *Primary Examiner.*

DAVID SCHONBERG, *Examiner.*